No. 721,864. PATENTED MAR. 3, 1903.
A. G. COX.
TOBACCO TRUCK.
APPLICATION FILED SEPT. 24, 1902.
NO MODEL.
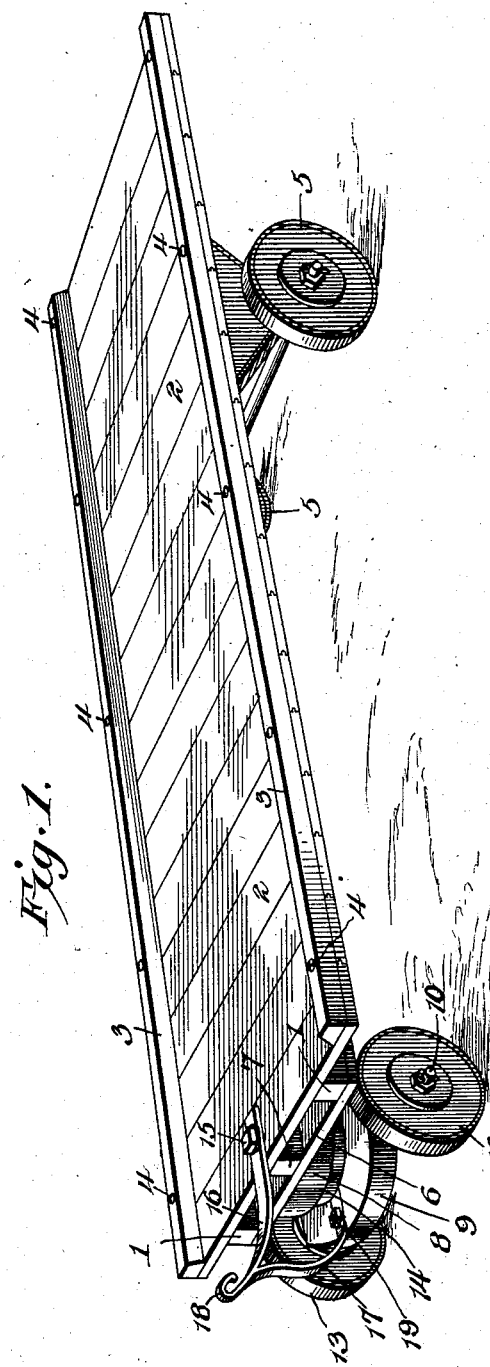
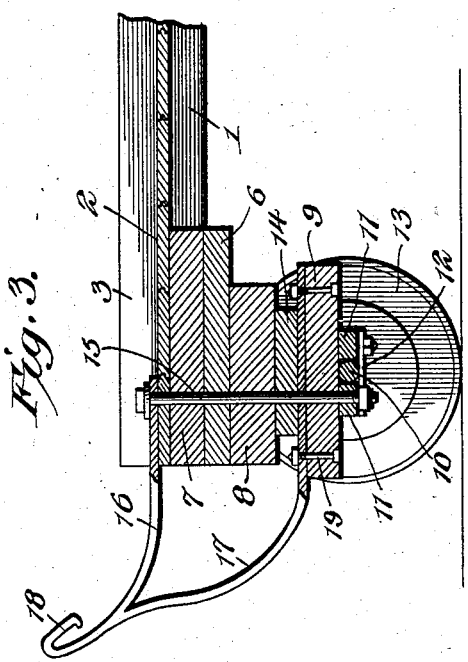
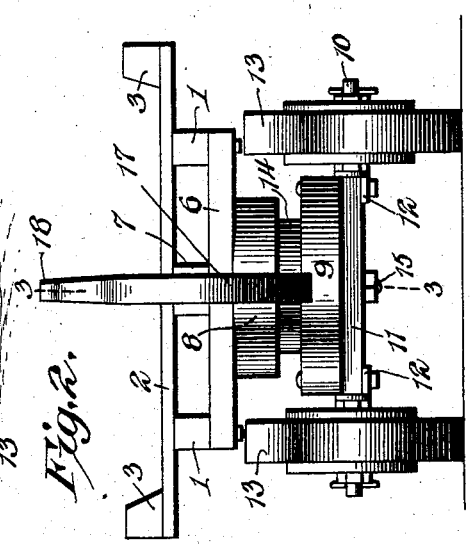
Amos G. Cox, Inventor,
By
Attorney
Witnesses
Howard W. Orr

UNITED STATES PATENT OFFICE.

AMOS G. COX, OF WINTERVILLE, NORTH CAROLINA, ASSIGNOR TO HIMSELF, ROWAN COOPER AND A. G. COX MANUFACTURING COMPANY, OF WINTERVILLE, NORTH CAROLINA.

TOBACCO-TRUCK.

SPECIFICATION forming part of Letters Patent No. 721,864, dated March 3, 1903.

Application filed September 24, 1902. Serial No. 124,663. (No model.)

*To all whom it may concern:*

Be it known that I, AMOS G. COX, a citizen of the United States, residing at Winterville, in the county of Pitt and State of North Carolina, have invented a new and useful Tobacco-Truck, of which the following is a specification.

This invention relates to trucks, and is designed to provide an improved draft connection therefor which is disposed to distribute the draft between the body of the truck and the front pivotal wheeled axle.

It is furthermore designed to have the draft-animal connected directly to the front axle, so that said front axle may quickly turn in whatever direction the animal is driven, and thereby facilitate the turning of the truck, especially where a short turn is desired.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a tobacco-truck embodying the features of the present invention. Fig. 2 is a detail front elevation thereof. Fig. 3 is a sectional view taken on line 3 3 of Fig. 2.

Like characters of reference designate corresponding parts in all the figures of the drawings.

The platform or body of the present truck is made up of a pair of spaced longitudinal sills 1, across which the bottom or floor boards 2 are secured, with longitudinal bars 3 secured to the upper side of the floor at the opposite longitudinal edges thereof and provided with upstanding sockets 4 for the reception of standards. (Not shown.) The rear end of the truck is mounted upon wheels 5, which are carried by a stationary axle secured to the body in any suitable manner.

At the front of the truck there is a body-bolster made up of a plate 6, secured to the under sides of the sills 1 and braced at an intermediate point by means of a filling-block 7, interposed between the plate and the body of the truck, there being a block 8, preferably in the form of a disk, rigidly secured to the under side of the plate and midway between the ends thereof.

Beneath the front bolster there is a wheeled truck made up of a circular or disk-shaped body 9, with an axle 10 disposed diametrically across the under side of the body and situated between a pair of cleats 11, which are secured to the body and lie substantially parallel with the axle. Suitable bearing members 12 are secured across the under sides of the cleats and across the under side of the axle, so as to support the same. The ends of the axle project at opposite sides of the truck, and wheels 13 are loosely mounted upon the projected ends of the axle. A smaller disk 14 is secured concentrically to the top of the disk 9, and a king-bolt 15 pierces the body of the truck, bolster, and the wheeled truck and is also disposed in front of the axle.

For connecting a draft-animal to the truck there is a draw-bar which is made up of upper and lower members 16 and 17, respectively, the forward ends of which are mutually connected and formed into an upstanding hook 18, with which a whiffletree or the like is adapted to be connected, while the rear ends of the members are separated and connected, respectively, to the body of the truck and the wheeled truck. The rear end of the upper member 16 is provided with a terminal perforation through which the king-bolt passes, whereby a pivotal connection is formed between the member and the body of the truck. The rear end of the lower member 17 is inserted between the disks 9 and 14, is let in flush with the upper face of the lower disk 9, and is rigidly secured thereto by means of fastenings 19, which pass through the member and the disk 9. The lower draw-bar member is also provided with a perforation for the pivotal reception of the king-bolt.

From the foregoing description it is apparent that the draw-bar is connected to the body of the truck and also to the pivotal front axle, whereby said axle is under the control of the draft-animal and is quickly turned in whatever direction the animal is driven, whereby the truck may be turned within its length. Moreover, the strain of the draft is distributed between the body of the truck and the wheeled axle, and the latter is thereby prevented from binding upon the body of the truck.

What is claimed is—

1. The combination of a platform, a front axle located beneath the platform and pivotally connected with the same and provided at its ends with wheels, and a draw-bar provided with upper and lower members disposed in the same vertical plane, the lower member being rigidly connected with the axle at a point between the wheels and the upper member being secured to the platform by the pivot of the axle and being movable with the lower member, substantially as described.

2. The combination of a platform, a front axle pivotally connected with and located beneath the platform and provided at its ends with wheels, a plate or body secured to the front axle and arranged above the same and supporting the front end of the platform, and a draw-bar having upper and lower members, the lower member being rigidly secured to the plate or body of the front axle and the upper member being secured to the platform by the pivot of the front axle and being movable with the lower member, substantially as described.

3. The combination of a platform provided at its front end with a depending bolster, disks fixed to the bolster and depending therefrom, a front axle provided at its center with a disk, a king-bolt passing through the disks and pivotally connecting the front axle with the platform, and a draw-bar provided with upper and lower members, the upper member being secured to the platform by the king-bolt and the lower member being fixed to the disk of the front axle, substantially as described.

4. The combination with a wheeled body having a front bolster, of a truck disposed beneath the bolster and provided with a wheeled axle, a king-bolt pivotally piercing the bolster and the truck and disposed at one side of the axle, and a draw-bar embodying upper and lower members, the forward ends of which are mutually connected and provided with a draft connection, the rear end of the lower member being rigidly secured to the truck and provided with a perforation receiving the king-bolt, and the upper member having its rear end provided with a perforation which receives the king-bolt and forms a pivotal connection therewith.

In testimony that I claim the foregoing as my own I have hereto affixed my signature in the presence of two witnesses.

AMOS G. COX.

Witnesses:
J. M. BLOW,
F. O. COX.